US00RE33913E

United States Patent [19]

Kral et al.

[11] E Patent Number: Re. 33,913

[45] Reissued Date of Patent: May 5, 1992

[54] DISPENSING RACK

[75] Inventors: Rudy Kral, Clifton, N.J.; Paul Belokin, Denton, Tex.

[73] Assignee: M & M Mars, a division of Mars Incorporated, Hackettstown, N.J.

[21] Appl. No.: 599,687

[22] Filed: Oct. 18, 1990

Related U.S. Patent Documents

Reissue of:

[64] Patent No.: 4,782,959
Issued: Nov. 8, 1988
Appl. No.: 33,760
Filed: Apr. 3, 1987

[51] Int. Cl.[5] ..... A47F 7/00

[52] U.S. Cl. ..... 211/59.2; 211/105.6; 312/42

[58] Field of Search ..... 211/59.2, 59.3, 59.4, 211/105.6; 312/42, 43, 45, 71

[56] References Cited

U.S. PATENT DOCUMENTS

| | | | |
|---|---|---|---|
| 698,223 | 4/1902 | Prideaux | 211/105.6 X |
| 1,711,329 | 4/1929 | Short | 211/59.2 X |
| 2,149,821 | 3/1939 | Sutherland | 312/45 |
| 2,669,361 | 2/1954 | Just | 211/59.2 |
| 3,019,907 | 2/1962 | Belejack | 211/59.2 |

*Primary Examiner*—David M. Purol
*Assistant Examiner*—Sarah A. Lechok
*Attorney, Agent, or Firm*—Curtis, Morris & Safford

[57] ABSTRACT

A dispensing rack for use in a refrigerated environment for dispensing a leading item from a stack of items which includes a housing adapted to receive the items in associated ramps releasably secured within the housing by a plurality of horizontal connecting rods. One of the connecting rods engages abutment posts extending downwardly from the ramps and another connecting rod engages a rear flange extending downwardly from the ramp. The connecting rod engaging the rear flange is positioned at a horizontal plane above the horizontal plane of the connecting rod engaging the abutment post so that the ramps are generally forwardly inclined. In such an inclined position, when the leading item in the stack of items within each ramp is withdrawn, the next leading item is placed into a convenient position to be withdrawn as a result of the positive gravity feed of each ramp. The ends of each connecting rod are also cooperatively retained to a corresponding horizontal retention member formed within the housing by clip retention means.

18 Claims, 8 Drawing Sheets

DISPENSING RACK

Matter enclosed in heavy brackets [ ] appears in the original patent but forms no part of this reissue specification; matter printed in italics indicates the additions made by reissue.

BACKGROUND OF THE INVENTION

The present invention generally relates to a display rack for retaining packaged items, and more particularly, to a display rack used in a refrigerated environment wherein the items, such as candy bars, are secured within inclined ramps mounted in a housing.

In recent years, there has been a substantial increase in the consumption of confectionary products, such as packaged candy bars, as well as packaged coated peanut and chocolate candy. A large number of consumers prefer to eat such confectionary products chilled. However, the method most often used by retailers to display confectionary products does not permit the products to be chilled when displayed and are displayed in open boxes along a counter. This method of display has the apparent disadvantage that the consumer must take the candy bar to his residence and chill the bar for a substantial period of time before consumption.

In prior attempts to provide the customer with chilled candy bars, the retailer has placed the bars on horizontal shelves mounted within a refrigerated housing. After a number of bars have been withdrawn, the retailer or clerk must waste valuable time by continually monitoring the inventory of bars within the shelves. After several purchases, the clerk must manually adjust the inventory so that the leading item is in a position for easy access by the consumer and to permit the items to be directly displayed for the customer. This method of display also has the inherent disadvantage that the consumer must extend his arm into the housing to obtain the leading candy bar from the row of bars which maximizes the potential for accidently spilling or breaking other items contained within the refrigerated housing.

In the past, the racks used to display items within the refrigerated unit were usually permanently affixed to the housing. This prevented the retailer from easily stocking the racks without completely dismantling the racks from the housing.

OBJECTS OF THE INVENTION

It is a general object of this invention to provide a display rack for dispensing packaged items, such as packaged candy bars or packaged coated peanut and chocolate candy for particular use in a refrigerated environment.

It is a further object of this invention to provide a display rack which reliably retains at least one generally horizontally inclined ramp which contains the items so that when the leading item or candy bar is withdrawn, the next leading item is placed in a position for easy withdrawal as a result of the positive gravity feed of the inclined ramp.

It is yet another object of this invention to provide a display rack which includes telescopic connecting rods releasably securing the inclined ramps within a housing so that the ramps may be retained within variably-sized housings.

It is still a further object of this invention to provide a display rack having inclined ramps which are releasably secured within the housing wherein the ramps are easily removed permitting the ramps to be easily stocked with new inventory.

It is yet a further object of this invention to provide a display rack which includes a novel design for a clip which rigidly secures the connecting rods adjacent to the housing.

Other objects and advantages of the invention will become apparent from the following detailed description and from the appended drawings in which like numbers have been used to describe like parts of the several views.

SUMMARY OF THE INVENTION

This invention relates to a display rack for use in a refrigerated environment for dispensing packaged items, such as candy bars, which are generally angularly stacked within a refrigerated housing. The packaged items are retained along the base of at least one inclined ramp mounted within the refrigerated housing. The ramps are releasably engaged with a plurality of horizontal connecting rods with one of the connecting rods engaging a plurality of abutment posts which extend downwardly from the base of the ramp and another of the connecting rods engaging a rear flange extending downwardly from the base of the inclined ramp. The connecting rod engaging the rear flange is positioned at a horizontal plane above the horizontal plane of the connecting rod which engages the abutment posts so that the ramp is forwardly inclined. In this inclined position, the leading item retained within the ramp is restrained from the further forward movement by a front flange extending upwardly from the base of the ramp. In addition, when the leading item is withdrawn from the ramp, the next leading item is placed in a convenient position to be withdrawn as a result of the positive gravity feed of each ramp.

In accordance with one of the general objects of the present invention, each rod is securely mounted to a pair of parallel horizontal members of the housing by a specially-designed clip. Each clip includes a projection disposed inwardly therefrom which cooperatively engages an aperture inwardly formed at the ends of each rod. The clips also include a pair of horizontal flanges outwardly disposed therefrom which receive and retain the horizontal members therebetween by a snap fit so that the rod is securely retained adjacent to the horizontal members.

Since refrigerated housings vary in dimension, it is important that the dispensing rack of this invention be adaptable to housings of different size. This object is achieved by the connecting rods being telescopic in length. In the preferred embodiment, each connecting rod includes three sections: (1) a first section which has a first inner aperture; (2) a second section having a first cylindrical member received within the first inner aperture and slidably retained within the first inner aperture, and a second cylindrical member having a second inner aperture formed therein terminating at a closed end; and (3) a third section having a third cylindrical member in biasing engagement with the second inner aperture as a result of a spring being circumferentially disposed around the third cylindrical section. This spring abuts the closed end of the second section so that the length of each connecting rod may be varied to the size of the individual refrigerated housings when the first, second, and third sections are interconnected.

BRIEF DESCRIPTION OF THE DRAWINGS

The following detailed description, given by way of example but not intended to limit the present invention solely to the specific embodiments described, may best be understood in conjunction with the accompanying drawings in which.

DETAILED DESCRIPTION OF A PREFERRED EMBODIMENT

Figure 1:
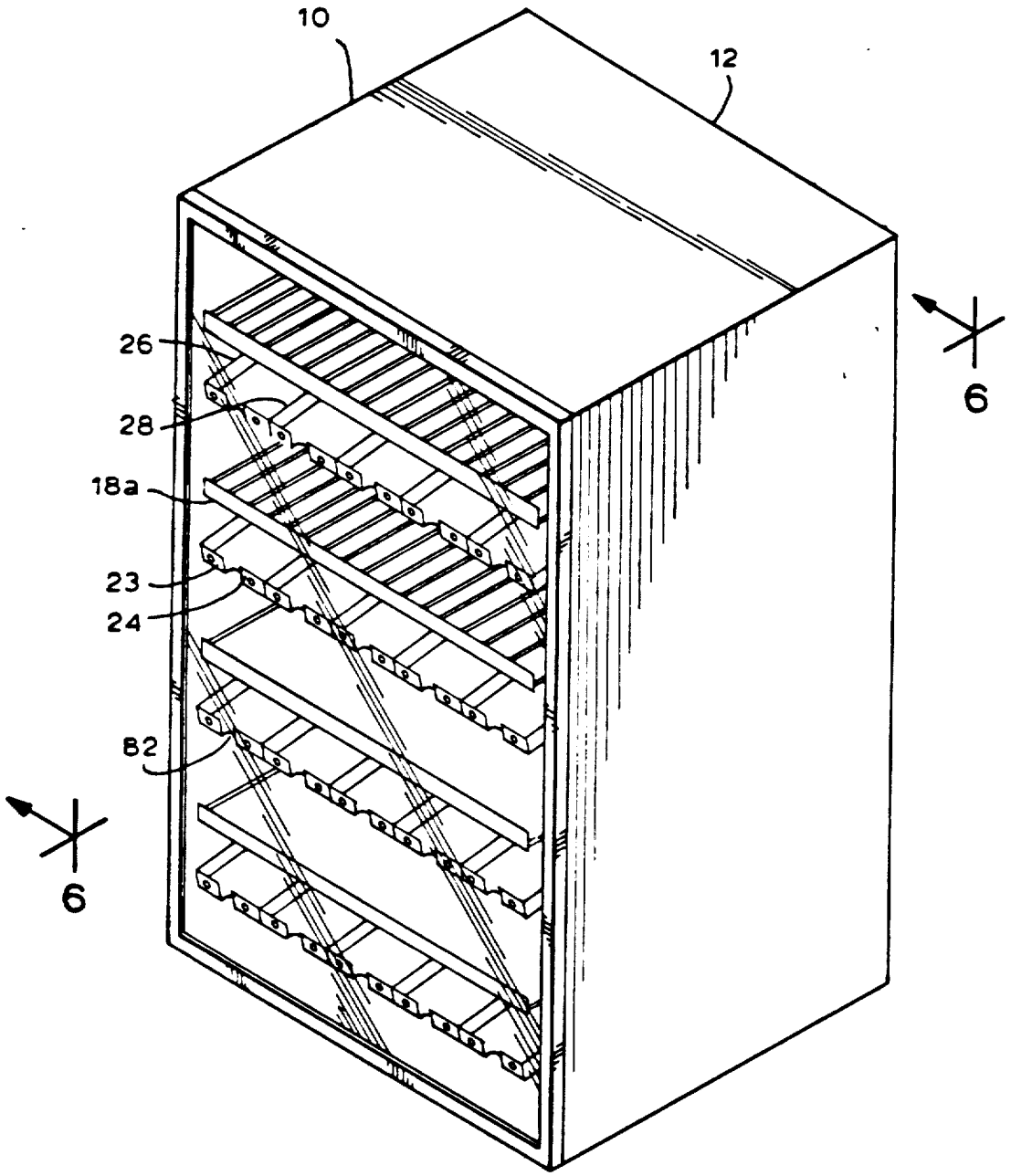
FIG. 1 is a front perspective view of the refrigerated housing of the present invention.
Figure 6:
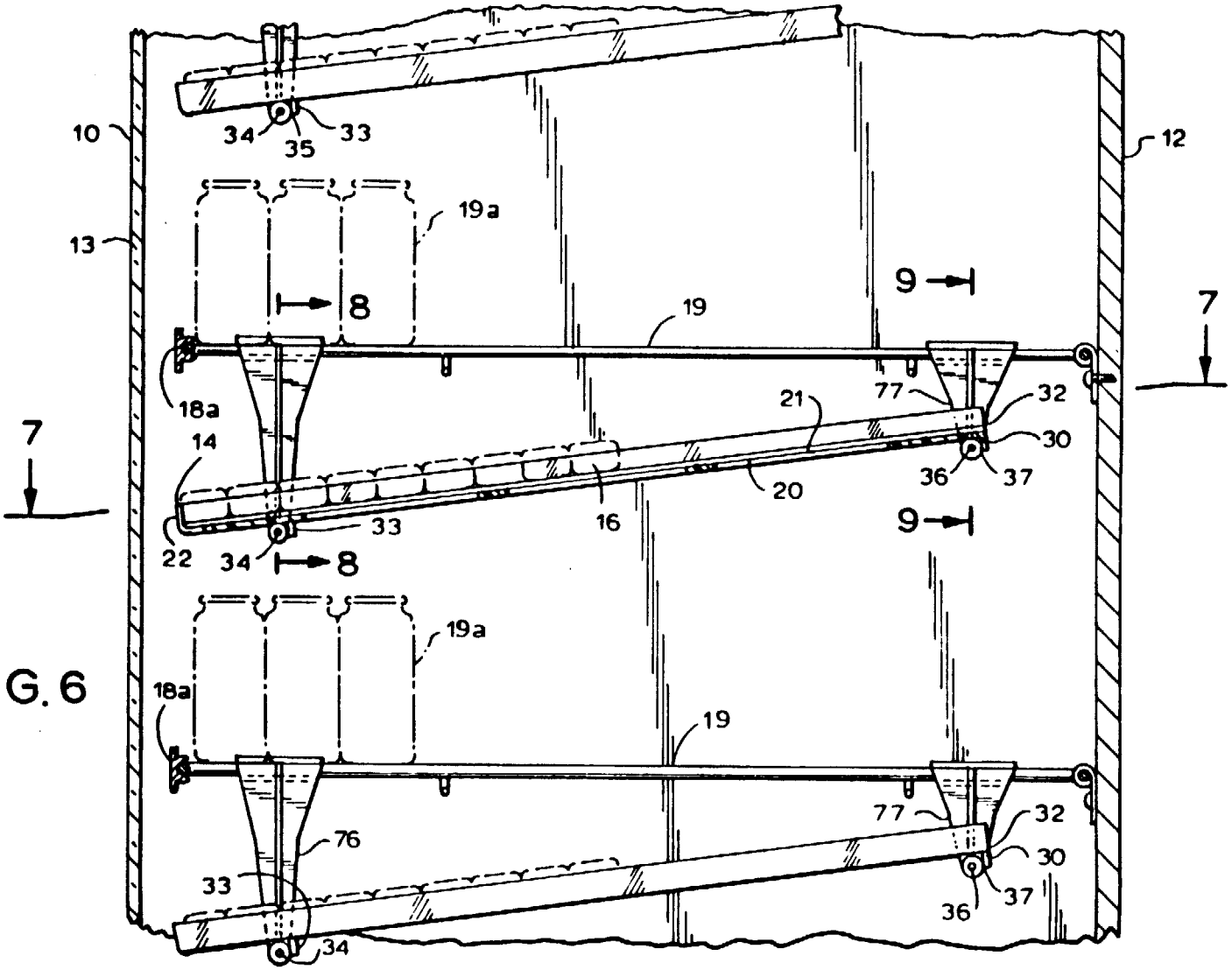
FIG. 6 is a partial cross-sectional view taken along line 6—6 shown in FIG. 1.

Referring now to FIGS. 1 and 6, a display rack 10 for use in a refrigerated environment is shown within a refrigerated housing 12 which can be opened or closed by a slidable front door 13, preferably a glass sliding door. Housing 12 is adapted for dispensing a leading item 14, such as chilled candy bars, from a generally angularly displaced stack or row of items 16.

Figure 3:
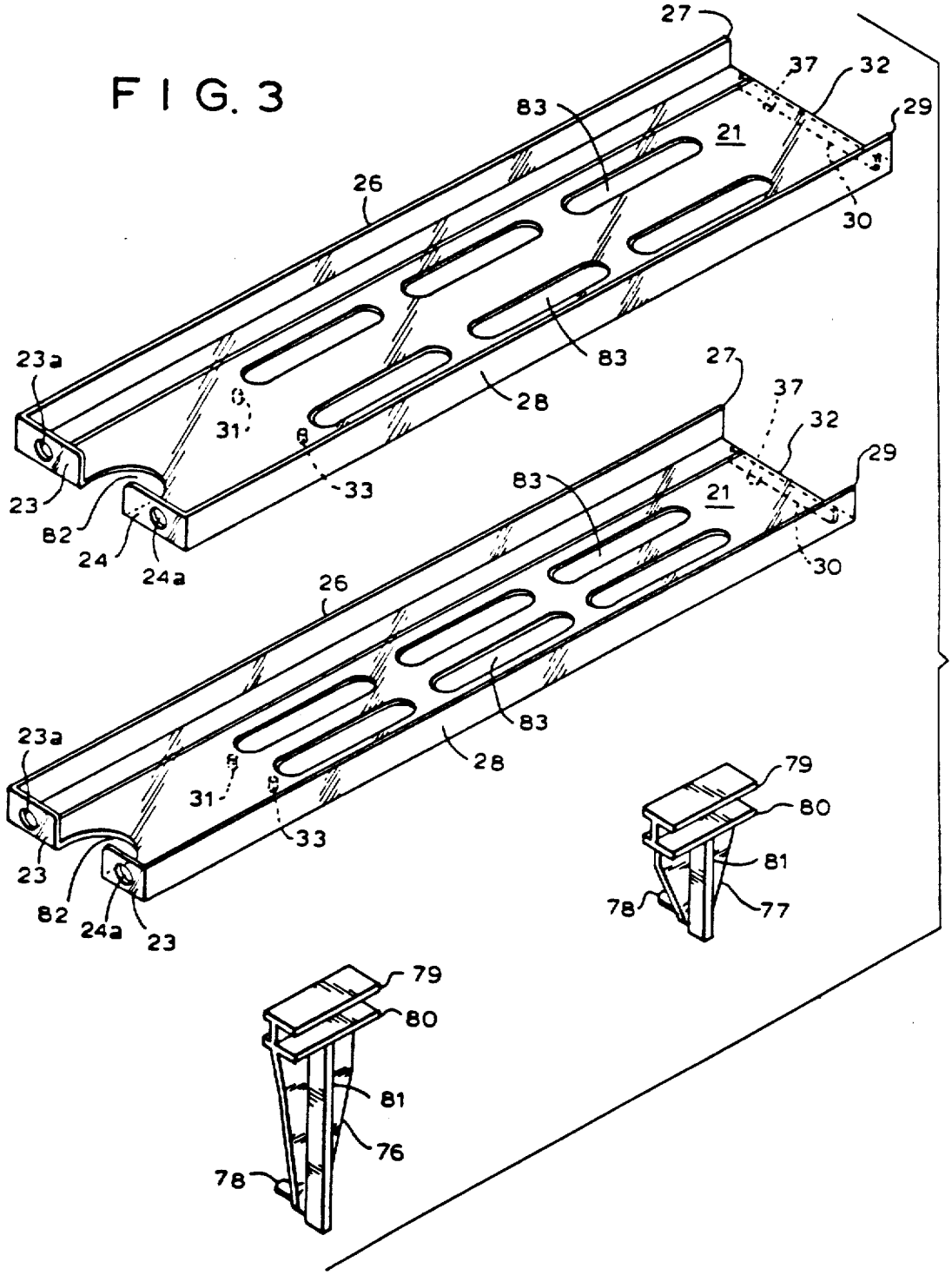
FIG. 3 is an exploded perspective view of the display rack showing the inclined ramps and clips of the present invention.
Figure 7:
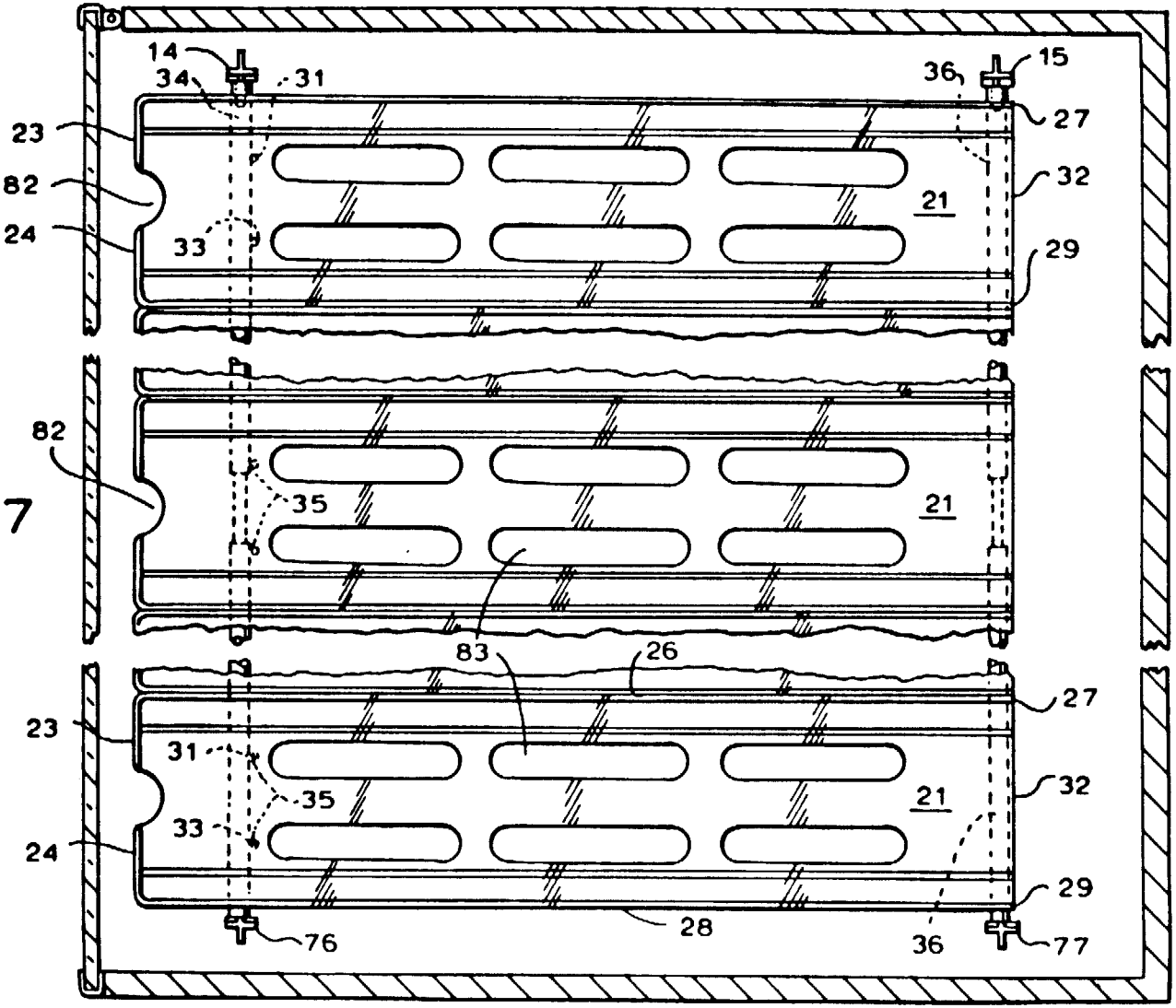
FIG. 7 is a cross-sectional view taken along line 7—7 shown in FIG. 6.

The candy bars are placed within ramps 20 specially designed to restrain movement of the bars therein and to provide easy stocking of the bars within each ramp 20. A base 21 of each ramp 20 supports the candy bars therein. Referring also to FIGS. 3, 6, and 7, ramps 20 include a front flange 22 having two independent sections 23 and 24 to restrain the leading item or candy bar 14 from advancing in each ramp while permitting ready access to the leading candy bar. Independent sections 23 and 24 each possess embossed openings 23A and 24A, respectively. Embossed openings 23A and 24A allow for product identification of the items contained in the ramp. The stack of items 16 is also restrained from lateral movement within each ramp 20 by side flanges 26 and 28 extending upwardly from base 21. As best shown in FIGS. 3, 6 and 7, each ramp 20 also includes a rear flange 30 and forwardly disposed abutment posts 31 and 33 extending downwardly from base 21 to facilitate positioning of the ramps. The items to be retained within the ramps 20 are easily stocked within each ramp 20 through a rear opening 32 formed between the rear ends 27 and 29 of side flanges 26 and 28.

For effectiveness and convenience, the ramps 20 are releasably secured within housing 12. This permits easy withdrawal of the ramps from housing 12 so that the inventory of items within each ramp can be easily replenished. Each ramp should also be situated within housing 12 such that the leading item 14 of row 16 can be conveniently withdrawn. This is accomplished by a set of connecting rods, such as 34 and 36, being associated with each ramp 20 (FIGS. 6, 7). In addition, as shown in FIG. 7, a plurality of ramps may be accommodated by each pair of connecting rods 34 and 36. When properly positioned, connecting rod 34 engages the front surface 35 of each abutment post 31 and 33. The other connecting rod 36 engages the front surface 37 of rear flange 30 (FIGS. 3, 6). Connecting rod 36 is positioned within housing 12 at a horizontal plane above the horizontal plane of connecting rod 34 to releasably secure each ramp 20 in a generally horizontally forward inclined position wherein leading item 14 of the stack of items 16 is restrained from advancing further within each rack 20 by front flange 22. Thus, when leading item 14 is withdrawn, the next leading item in the stack of items 16 is placed into a convenient position to be withdrawn as a result of the positive gravity feed of each inclined ramp 20.

Figure 4:
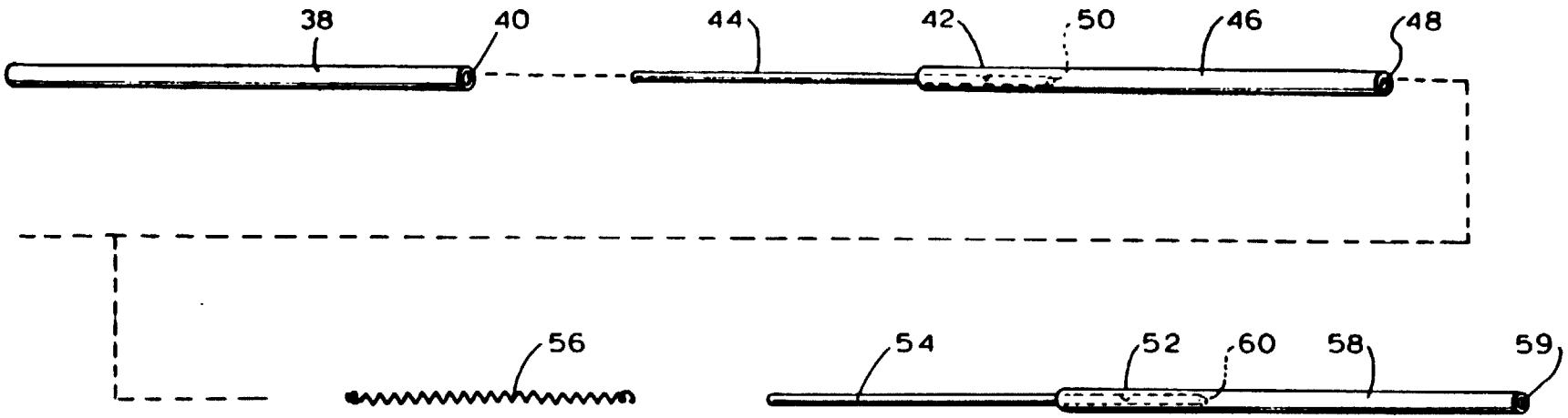
FIG. 4 is an exploded view of the connecting rod of the present invention.
Figure 5:
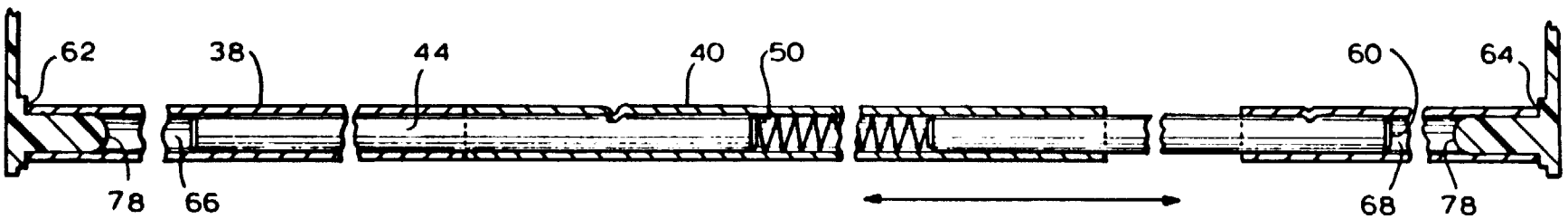
FIG. 5 is a cross-sectional view of the connecting rod of the present invention.

In accordance with one of the objects of this invention, each connecting rod is telescopic in length so that it can be securely retained within variably-sized housings. As best shown in FIGS. 4 and 5, the connecting rods include a first section 38 having a first inner aperture 40 and a second section 42 comprised of a first cylindrical member 44 which is slidably inserted within first inner aperture 40. Second section 42 also includes a second cylindrical member 46 of the same radius as the radius of first section 38 which abuts against first section 38. The outer free end of second cylindrical member 46 includes a second inner aperture 48 inwardly formed therein. Second inner aperture 48 forms a chamber which terminates at a closed end 50. A third section 52 of each connecting rod includes a third cylindrical member 54 of the same radius as the first cylindrical member 44 of second section 42. Third cylindrical member 54 is in biasing engagement and fitted within second inner aperture 48 by a first spring 56 circumferentially disposed around third cylindrical member 54. The first spring 56 is slidably received within second inner aperture 48 and compresses upon contact with closed end 50. Third section 52 of the connecting rods also includes a fourth cylindrical member 58 of the same radius as second cylindrical member 46 which, as aforedescribed, has the same radius as first section 38. The free end of the fourth cylindrical member 58 includes a third inner aperture 59 inwardly formed therein which terminates in a closed end 60. This third inner aperture 59 is adapted to receive another cylindrical member, such as 44 or 54, and a corresponding spring to lengthen the connecting rods to the variable size of each housing 12. In addition, for smaller width housings, second section 42 may be eliminated and third cylindrical member 54 may be slidably inserted within first inner aperture 40. In this manner, the display rack 10 as disclosed herein can be adapted for use in variable sizes of housings 12, and in turn, a variable number of racks 20 can be retained by the corresponding connecting rods 34 and 36.

As a result of downward force being applied upon connecting rods 34 and 36 by the items contained within ramps 20, the connecting rods must be securely retained within housing 12. In the preferred embodiment, the first and second outer ends 62 and 64 of each connecting rod 34 and 36 are individually securely retained to housing 12 by a specially designed clip, such as 76 (FIG. 3). First and second outer ends 62 and 64 include, respectively, first and second outer end apertures 66 and 68 which are inwardly formed therein (FIG. 5). First and second outer end apertures 66 and 68 each receive a projection 78 inwardly disposed from an associated clip.

Figure 8:
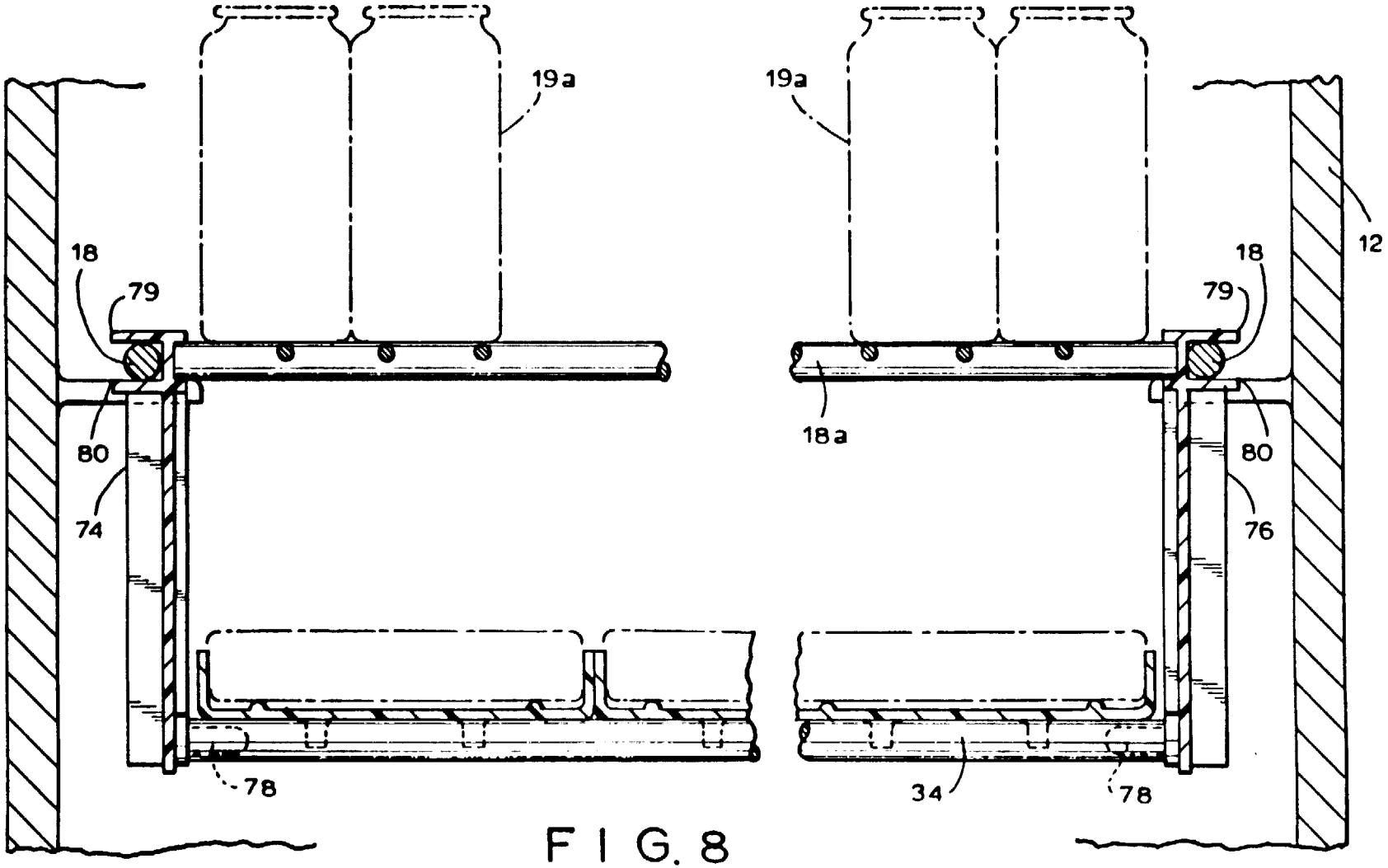
FIG. 8 is a partial front-sectional view taken along line 8—8 shown in FIG. 6.
Figure 9:
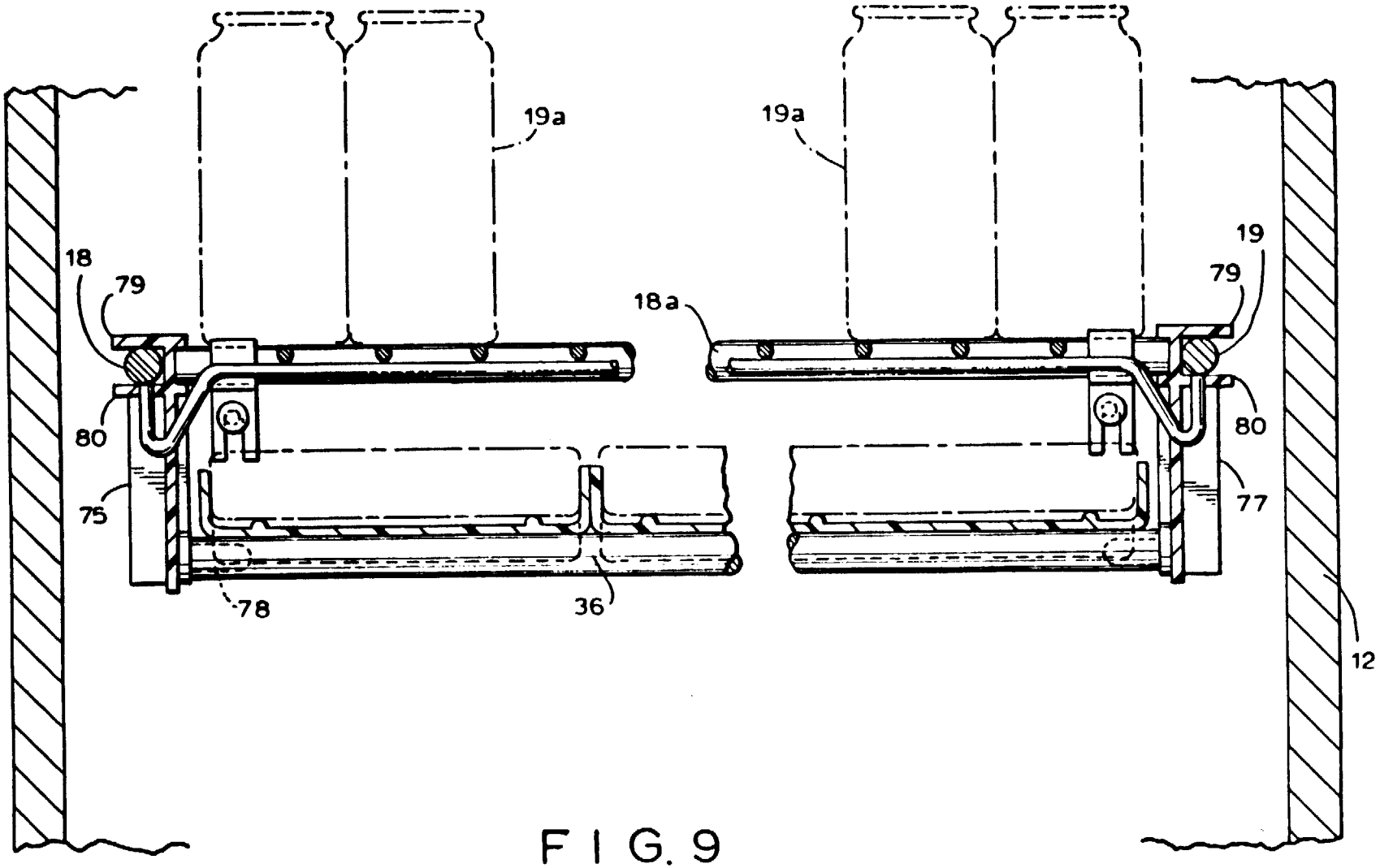
FIG. 9 is another partial front-sectional view taken along 9—9 shown in FIG. 6.

As shown in FIG. 8, the first or front connecting rod 34 is mounted to housing 12 by clips 74 and 76. As shown in FIG. 9, the rear or second connecting rod 36 is mounted to housing 12 by clips 75 and 77.

Figure 2:
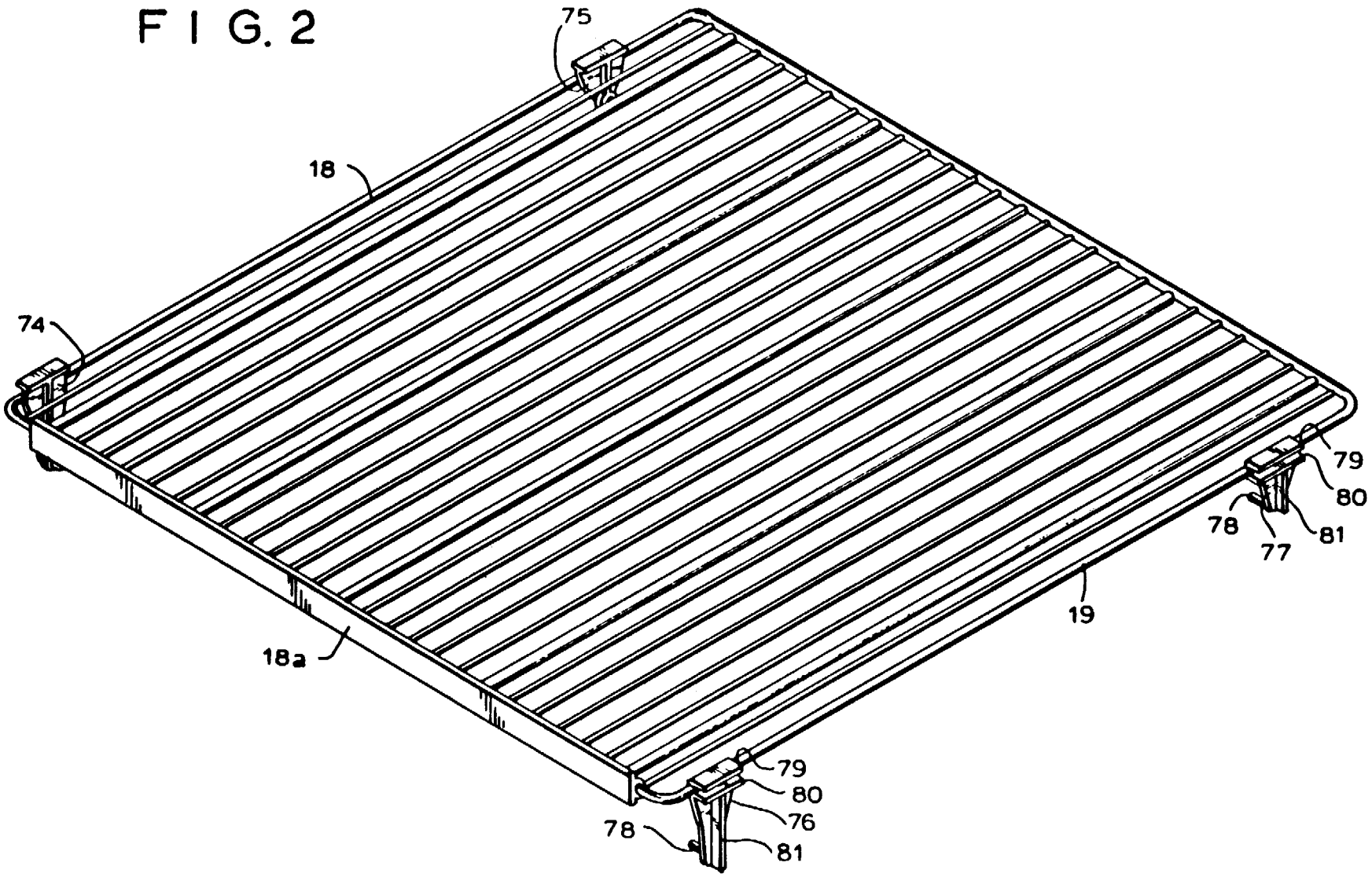
FIG. 2 is a front perspective view of a plurality of clips engaging the horizontal retention members of the horizontal support rack of the present invention.

As best shown in FIG. 3, each clip includes a pair of horizontal flanges 79 and 80 extending outwardly therefrom. Referring now to FIGS. 2, 8 and 9, flanges 79 and 80 engage the horizontal retention members, such as 18 and 19, therebetween. This provides for a snap fit of each clip to the associated horizontal retention member and, therefore, provides for the secure retainment of connecting rods 34 and 36 within housing 12. The horizontal retention members 18 and 19 form the side edges of a horizontal support rack 18A (FIG. 2) which is capable of supporting containers 19A such as soda cans, milk cartons, etc. (FIGS. 6, 8 and 9). The horizontal support racks are supported within housing 12 (see FIG. 1). Returning to FIG. 3, the clips also include angular strength members 81 extending inwardly from the mid-plane of the clips. Strength members 81 provide for rigidity and stability of the clips.

As shown in FIGS. 3, 6, 8 and 9, the pair of clips 74 and 76 engaging the first or front connecting rod 34 and the pair of clips 75 and 77 engaging the second or rear connecting rod 36 are of different sizes in that clips 74 and 76 are greater in height than clips 75 and 77. As is best shown in FIG. 6, this difference in height allows a downward or forward inclination of the ramps 20 toward the door 13 of the refrigerated housing 12.

As shown in FIGS. 3 and 7, each ramp 20 may be provided with a cut-out 82 formed along base 21 and positioned generally between the two sections 23 and 24 of front flange 22. The cut-out provides for easy access and grasping of leading item 14 within the stack of items 16.

The present invention also provides for the even chilling of the items or candy bars contained within ramps 20. Still referring to FIGS. 3 and 7, each ramp 20 includes elongated slotted openings 83 in base 21. The elongated slotted openings permit refrigerated air to circulate to the under-side of the items or candy bars in the ramps so that a more even distribution of chilling is effectuated.

In operation, horizontal members 18 and 19 are insertably retained within the pair of horizontal flanges 79 and 80 of each clip.

FIG. 2 shows an entire horizontal support rack 18A in which clips 74 and 75 are engaging horizontal retention member 18 and clips 76 and 77 are engaging horizontal retention member 19. Flanges 79 and 80 of clips 76 and 79 are shown snapily engaging horizontal retention member 19. First and second outer apertures 66 and 68 of the first and second outer ends 62 and 64 of each connecting rod are also insertably retained within the projection 78 inwardly disposed from each clip. As aforedescribed, each rod is telescopic and can be fitted into any sized housing by its multiple section design, such as first, second, and third sections 38, 42, and 52. The connecting rods are placed in a position such that the rear or second connecting rod 36 is placed at a horizontal plane above the horizontal plane of the first or front connecting rod 34. The clip structure, as disclosed herein, provides for the secure retainment of the rods within the housing.

Each ramp 20 is releasably secured within housing 12 by positioning the ramps in housing 12 such that the front surface 35 of each abutment post 31 and 33 abuts and is restrained from further movement by connecting rod 34 and front surface 37 of rear flange 30 abuts and is restrained from further movement by connecting rod 36. In the preferred embodiment, more than one abutment post is shown so that a stable retention of the ramps within the housing is provided. In its retained position, each ramp 20 is generally horizontally forwardly inclined. The retailer can stock the ramps 20 by placing each item within rear opening 32 and allowing the items to slide down each ramp 20. The leading item 14 of these stack of items 16 is restrained from further forward movement by front flange 22. As a result of the positive gravity feed of each ramp 20, when the leading item 14 is withdrawn from the ramp, the next leading item in the stack of items is placed in a position where it is easily accessible to the clerk or purchaser. The next leading item will also be restrained from further forward movement by front flange 22. While in the refrigerated environment, the items and candy bars within each ramp 20 are more evenly chilled as a result of refrigerated air circulating through the elongated slotted openings 83 formed within base 21 of each ramp 20.

As disclosed herein, each ramp can be easily removed from housing 12 so that it can be easily stocked by the retailer. In addition, any number of ramps can be retained by the connecting rod 34 and 36, the only limitation being the size of the housing 12.

What is claimed is:

1. A dispensing rack adaptable in a refrigeration unit for dispensing a leading item from a stack of items comprising:

a housing adapted to receive a plurality of items to be dispensed and having a plurality of horizontal retention members;

at least one individual ramp releasably secured within the housing and retaining the items therein on a base and having a front flange extending upwardly from the base, a rear flange extending downwardly from the base, a plurality of abutment posts extending downwardly from the base, and means to constrain the items therein; and a plurality of horizontal connecting rods each having first and second ends, the ends each being cooperatively retained to a horizontal retention member by clip retention means which insertably receives and retains the horizontal retention members and cooperatively retains the ends of the rods supporting the ramp within the housing, one of the connecting rods engaging the abutment posts and another rod engaging the rear flange at a horizontal plane above the horizontal plane of the rod engaging the abutment posts to releasably secure the ramp in a generally horizontal inclined position wherein the leading item in the ramp is restrained from advancing therein by the front flange and when the leading item is withdrawn, the next leading item is placed into a convenient position to be withdrawn as a result of the positive gravity feed of the ramp.

2. The dispensing rack of claim 1 wherein the means to constrain items include parallel upper extending side flanges of the ramp.

3. The dispensing rack of claim 1 wherein:

the ends of the rods include end apertures formed therein; and the clip retention means include a clip, a projection disposed inwardly of the clip which cooperatively engages each end aperture of each rod, and a pair of parallel horizontal flanges outwardly disposed from the clip which receive and retain the horizontal member therebetween so that the rod is securely retained within the housing.

4. The dispensing rack of claim 1 wherein the connecting rods include telescopic means so that the rods may be securely retained within variably-sized housings.

5. The dispensing rack of claim 4 including biasing means associated with said telescopic means to outwardly bias said rods.

6. The dispensing rack of claim 4 wherein the telescopic means include a first section having a first inner aperture, second section having a first cylindrical member which is received within the first inner aperture and slidably retained within the first section and a second cylindrical member having a second inner aperture terminating at a closed end, and a third section having a third cylindrical member which is in biasing engagement with the second inner aperture as a result of a first spring means disposed circumferentially around the third cylindrical section which abuts the closed end to thereby vary the length of the connecting rod.

7. The dispensing rack of claim 1 wherein the ramp includes a cut-out section in the base adjacent to the front flange to provide easy withdrawal of the leading item from the stack of items.

8. The dispensing rack of claim 1 wherein the base of each individual ramp includes at least one elongated opening so that the items will be more evenly refrigerated in the refrigerated environment.

9. The dispensing rack of claim 1 wherein the clip retention means are of varying sizes so that the ramp is in a generally horizontal inclined position when the clip retention means cooperatively retain the ends of the horizontal connecting rods to the horizontal retention member.

*10. A dispensing rack adaptable in a refrigeration unit for dispensing a leading item from a stack of items comprising:*

*a housing adapted to receive a plurality of items to be dispensed and having a plurality of horizontal retention members;*

*at least one individual ramp releasably secured within the housing and retaining the items wherein on a base and having a front flange extending upwardly from the base and means to constrain the items therein; and*

*a plurality of horizontal connecting rods each having first and second ends, the ends each being cooperatively retained to a horizontal retention member by clip retention means which insertably receives and retains the horizontal retention member and cooperatively retains the ends of the rods supporting the ramp within the housing, one of the connecting rods engaging the ramp at a horizontal plane above the horizontal plane of the other rod engaging the ramp to secure the ramp in a generally horizontal inclined position wherein the leading item in the ramp is restrained from advancing therein by the front flange and when the leading item is withdrawn, the next leading item is placed into a convenient position to be withdrawn as a result of the positive gravity feed of the ramp.*

*11. The dispensing rack of claim 10 wherein the means to constrain items include parallel upper extending side flanges of the ramp.*

*12. The dispensing rack of claim 10 wherein:*

*the ends of the rods include end apertures formed therein; and*

*the clip retention means include a clip, a projection disposed inwardly of the clip which cooperatively engages each end aperture of each rod, and a pair of parallel horizontal flanges outwardly disposed from the clip which receive and retain the horizontal member therebetween so that the rod is securely retained within the housing.*

*13. The dispensing rack of claim 10 wherein the connecting rods include telescopic means so that the rods may be securely retained within variably-sized housings.*

*14. The dispensing rack of claim 13 including biasing means associated with said telescopic means to outwardly bias said rods.*

*15. The dispensing rack of claim 13 wherein the telescopic means include a first section having a first inner aperture, second section having a first cylindrical member which is received within the first inner aperture and slidably retained within the first section and a second cylindrical member having a second inner aperture terminating at a closed end, and a third section having a third cylindrical member which is in biasing engagement with the second inner aperture as a result of a first spring means disposed circumferentially around the third cylindrical section which abuts the closed end to thereby vary the length of the connecting rod.*

*16. The dispensing rack of claim 10 wherein the ramp includes a cut-out section in the base adjacent to the front flange to provide easy withdrawal of the leading item from the stack of items.*

*17. The dispensing rack of claim 10 wherein the base of each individual ramp includes at least one elongated opening so that the items will be more evenly refrigerated in the refrigerated environment.*

*18. The dispensing rack of claim 10 wherein the clip retention means are of varying sizes so that the ramp is in a generally horizontal inclined position when the clip retention means cooperatively retain the ends of the horizontal connecting rods to the horizontal retention member.*

* * * * *